United States Patent
Corrado et al.

(10) Patent No.: US 7,451,230 B2
(45) Date of Patent: Nov. 11, 2008

(54) EVALUATING CONNECTIVITY ON DATA-COMMUNICATION NETWORKS

(75) Inventors: Alessandro Corrado, Nichelino (IT); Giuseppe Larosa, Castellamonte (IT); Gianni Rossi, Torino (IT); Vinicio Vercellone, Torino (IT)

(73) Assignee: Telecom Italia S.p.A., Milan (IT)

( * ) Notice: Subject to any disclaimer, the term of this patent is extended or adjusted under 35 U.S.C. 154(b) by 292 days.

(21) Appl. No.: 10/526,095

(22) PCT Filed: Sep. 1, 2003

(86) PCT No.: PCT/EP03/09692

§ 371 (c)(1), (2), (4) Date: Feb. 25, 2005

(87) PCT Pub. No.: WO2004/021650

PCT Pub. Date: Mar. 11, 2004

(65) Prior Publication Data

US 2005/0283527 A1    Dec. 22, 2005

(30) Foreign Application Priority Data

Sep. 2, 2002 (IT) .......................... TO2002A0762

(51) Int. Cl.
*G06F 15/173* (2006.01)
*G06F 15/16* (2006.01)

(52) U.S. Cl. .................. 709/238; 709/224; 709/239; 709/249

(58) Field of Classification Search .................. 709/223, 709/238–240, 224, 249; 370/230, 254, 216

See application file for complete search history.

(56) References Cited

U.S. PATENT DOCUMENTS

| | | | | |
|---|---|---|---|---|
| 6,415,323 | B1 * | 7/2002 | McCanne et al. | 709/225 |
| 6,553,423 | B1 * | 4/2003 | Chen | 709/230 |
| 6,751,663 | B1 * | 6/2004 | Farrell et al. | 709/224 |
| 6,785,704 | B1 * | 8/2004 | McCanne | 718/105 |
| 6,810,417 | B2 * | 10/2004 | Lee | 709/220 |
| 7,027,448 | B2 * | 4/2006 | Feldmann et al. | 370/401 |

(Continued)

OTHER PUBLICATIONS

A border gateway protocol (BGP-4) published Mar. 1995 by Roxen Community: RFC 1771.

(Continued)

*Primary Examiner*—Ario Etienne
*Assistant Examiner*—Hee Soo Kim
(74) *Attorney, Agent, or Firm*—Andrew Wilford (57) ABSTRACT

For the benefit of a reference ISP having a number of users, connectivity evaluations on a data communication network are performed relative to one or more ISPs of interest. Upon selecting a plurality of autonomous systems capable of forming a traffic source and/or destination for the users of the reference provider, tables of the BGP type are provided containing information on the paths available on the network for routing the traffic with regard to the above-mentioned autonomous systems. From these tables the paths of BGP type are extracted for the respective provider or providers of interest, searching for the paths that contain the respective AS number for the provider and/or providers of interest. For each autonomous system the oriented subpaths are extracted between each said autonomous system and the provider or providers of interest, identifying for each subpath the respective number of hops.

14 Claims, 5 Drawing Sheets

U.S. PATENT DOCUMENTS

| | | | |
|---|---|---|---|
| 7,035,202 B2 * | 4/2006 | Callon | 370/216 |
| 7,035,934 B1 * | 4/2006 | Lin | 709/238 |
| 7,180,864 B2 * | 2/2007 | Basu et al. | 370/238 |
| 2002/0021675 A1 * | 2/2002 | Feldmann | 370/254 |
| 2002/0101821 A1 * | 8/2002 | Feldmann et al. | 370/232 |
| 2002/0184393 A1 * | 12/2002 | Leddy et al. | 709/250 |
| 2003/0120769 A1 * | 6/2003 | McCollom et al. | 709/224 |
| 2003/0142682 A1 * | 7/2003 | Bressoud et al. | 370/401 |
| 2003/0204619 A1 * | 10/2003 | Bays | 709/238 |
| 2003/0231587 A1 * | 12/2003 | Sankaran et al. | 370/230 |

OTHER PUBLICATIONS

On inferring autonomous system . . . by L. Gao (Univ. of Massachussets).

Management timescale traffic engineering published Apr. 2001 by Management Timescales.

Overview and principles of internet traffic . . . by D. Awduche et al. (Network Working Group, May 2002.

A framework for internet traffic . . . by Wai Sum Lai et al. Traffic Eng. Working Group Mar. 2002.

Combining cisco netflow exports . . . J-P. Navarro et al. (2000 Lisa XIV, Dec. 2000).

* cited by examiner

| Connectivity Index | Candidate ISP |
|---|---|
| 58340001236700 | 1221 |
| 55188607780180 | 701 |
| 43087983032950 | 702 |
| 35837655185070 | 7015 |
| 34422146360440 | 1239 |
| 33572812436040 | 5373 |
| 31889401797860 | 3561 |
| 30574555481190 | 6347 |
| 30187603442240 | 174 |
| 29626009480000 | 6453 |
| 29496616085250 | 1755 |
| 27971230484660 | 3766 |
| 27765713309020 | 1 |
| 25859407580460 | 6461 |
| 25506323856430 | 3549 |
| 24470181436600 | 721 |
| 23824317648230 | 209 |
| 23605660566390 | 5650 |
| 23442648766340 | 2497 |
| 22634201491620 | 2914 |
| 21804596487630 | 3356 |
| 21489321914250 | 2548 |
| 20653422299540 | 1740 |
| 20306316403450 | 3967 |
| 19285565170900 | 7474 |
| 17804516322990 | 5696 |
| 16224537073650 | 268 |
| 15791487403940 | 2826 |
| 15055512881290 | 295 |
| 7952069357730 | 5459 |

| Connectivity Index | Candidate ISP |
|---|---|
| 4030092488610520 | 1 |
| 3787385878033370 | 6483 |
| 3514869500000760 | 293 |
| 3487857792132570 | 1239 |
| 3418478764973640 | 3581 |
| 3413681177476370 | 2497 |
| 3362291643351680 | 7918 |
| 3352261900628530 | 1740 |
| 3281616111749360 | 2828 |
| 3187421930787760 | 2914 |
| 3087619430044710 | 1221 |
| 2866881972678090 | 701 |
| 2853128000404450 | 1756 |
| 2609090144450560 | 2548 |
| 2415083278297770 | 3548 |
| 1836018264132220 | 5460 |
| 1278812812666650 | 3356 |
| 839660078869170 | 6373 |
| 603498489348140 | 266 |
| 433680833900370 | 209 |
| 390791956477090 | 6461 |
| 249269362674750 | 702 |
| 173661397960020 | 9967 |
| 77987597090200 | 6347 |
| 63233895676770 | 174 |
| 32839080015270 | 7474 |
| 16538353900130 | 3786 |
| 1247053263160 | 6696 |

Fig. 5

EVALUATING CONNECTIVITY ON DATA-COMMUNICATION NETWORKS

CROSS REFERENCE TO RELATED APPLICATIONS

This application is the US national phase of PCT application PCT/EP2003/009692, filed 1 Sep. 2003, published 11 Mar. 2004 as WO 2004/021650, and claiming the priority of Italian patent application TO2002A000762 itself filed 2 Sep. 2002, whose entire disclosures are herewith incorporated by reference.

FIELD OF THE INVENTION

The present invention concerns the techniques for performing connectivity evaluations on data-communication networks, such as the internet.

The solution according to the invention has been developed taking particular care of the problem of performing connectivity evaluations which may be used for instance for establishing peering relationships with specific internet service providers (ISP). For evaluating the opportunity of establishing co-operation relationships with a given provider it is important to make use of technical tools capable of supplying, for a given provider or Candidate ISP, an objective indication of the connectivity of the candidate itself, meant as the capability of the provider of meeting specific needs concerning the contents available and the procedure by which the information contents are made reachable over the network.

BACKGROUND ART

The routing over different domains on the Internet is performed through the protocol known as Border Gateway Protocol (BGP). For a general discussion of the characteristics and modes of use of the BGP protocol reference may be made to the document "A Border Gateway Protocol 4 (BGP-4)" by Y. Rekhter and T. Li, RFC 1771, T. J. Watson Research Center, Cisco, March 1995.

The BGP protocol allows each autonomous system (AS) to adopt its own policy in selecting the paths and propagating the reachability information on the other network users. These routing policies may however be dependent upon contractual commercial agreements among different administrative domains. For instance, an autonomous system AS may choose the policy of not providing transit services among its providers.

An evaluation of a provider connectivity, solely referred to the "technical" capability of a provider of transmitting information over the network, may be obtained by making resort to various solutions, commonly known in the present is art. However, such a solution is not capable of characterizing in a complete and fully correct way the features of a network such as the Internet.

Solutions have already been worked out which allow it in some way to infer the existence of specific customer/provider relationships on the network.

A solution of this kind is described for instance in the document "On inferring autonomous system relationships in the Internet" by Lixin Gao, GLOBECOM 2000-IEEE Global Telecommunications Conference, no. 1, November 2000, pages 387-396.

The solutions according to the present art considered above have in any case the drawback of providing in the whole a partial overview of the connectivity characteristics of the network, in particular concerning the overwhelming weight given to the physical transport characteristics of the network itself.

OBJECT OF THE INVENTION

The present invention has the purpose of providing a enhanced solution so as to overcome the limits involved in the solutions according to the known technique, described before.

SUMMARY OF THE INVENTION

According to the present invention this aim is attained by virtue of a method having the characteristics specifically recalled in the claims appended hereto.

The invention also concerns the corresponding system and information technology product, which can be directly loaded in the internal memory of a digital computing unit and includes portions of a software code, capable of performing the procedure according to the invention when the product is run on a computer.

BRIEF DESCRIPTION OF DRAWINGS

The invention will now be described by way of a non-limiting example, with reference to the attached drawings, wherein.

BEST MODE FOR CARRYING OUT THE INVENTION

Figure 1:
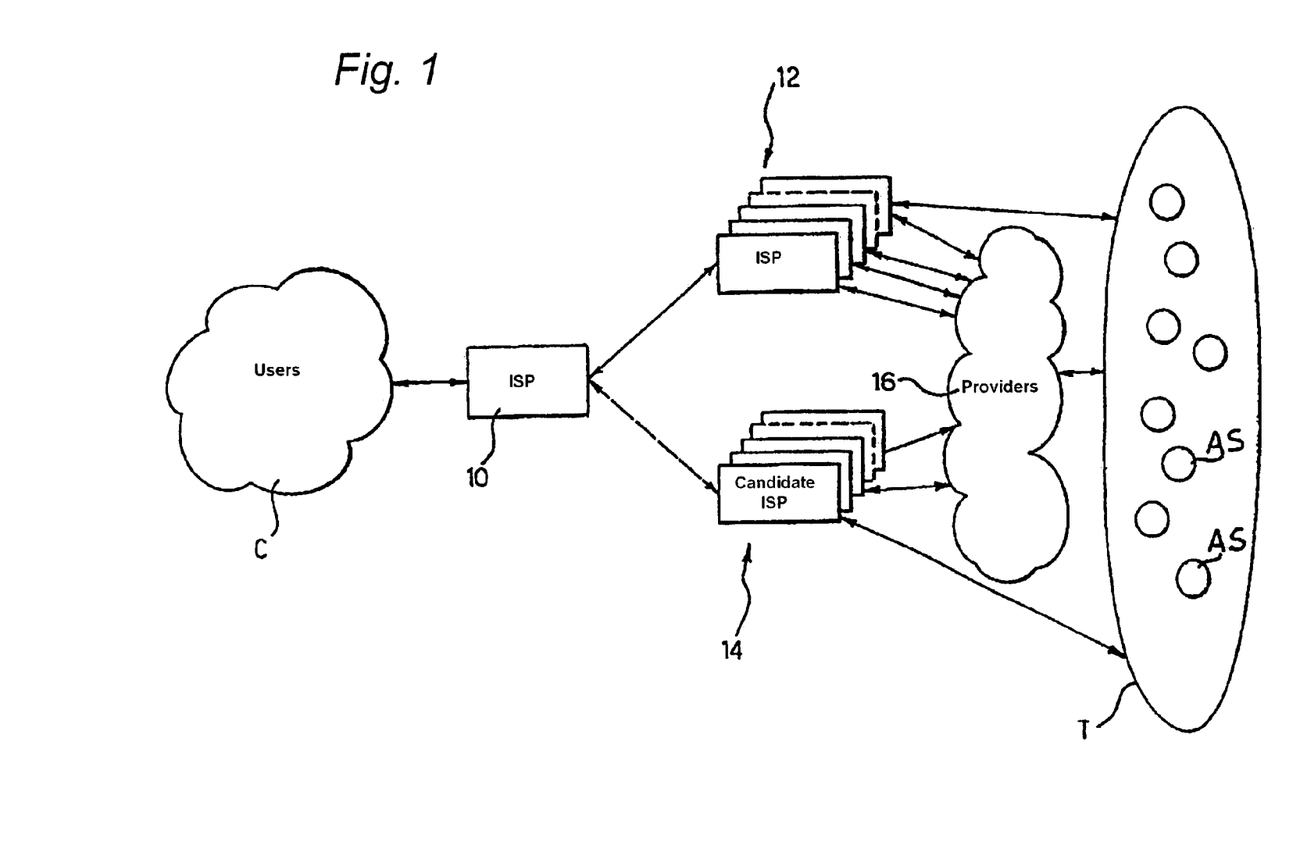
FIG. 1 depicts in general terms the context of possible application of the invention.

In the diagram of FIG. 1, there is denoted by 10 a first provider (ISP) which is identified in the sequel as a "reference" provider or ISP. To the reference provider are connected a set of respective users, denoted by C. Such users are interested in reaching or in being reached by a set of Autonomous Systems, ASs, belonging to the Internet and denoted as target ASs. To allow the traffic from and towards the AS systems of the group T, which may act as a traffic source and/or as a traffic destination for the users C, the ISP 10 cooperates with a set of additional ISPs, collectively denoted by 12, with which a so called peer-to-peer relationship has been established.

The system herein described is designed to perform connectivity estimates to evaluate the opportunity of establishing peering relationships with one or more providers, collectively indicated by 14, and generally defined as ISP "candidates." Each Candidate ISP is therefore at least potentially designed to add to the ISP 12 or to replace one of them.

Usually, due to the general complexity of the Internet, the target ASs of the group T are not directly reachable through the providers 12 or 14. The traffic is then routed through further additional providers, denoted collectively by 16, which however do not take up any specific relevance within this description.

Figure 2:
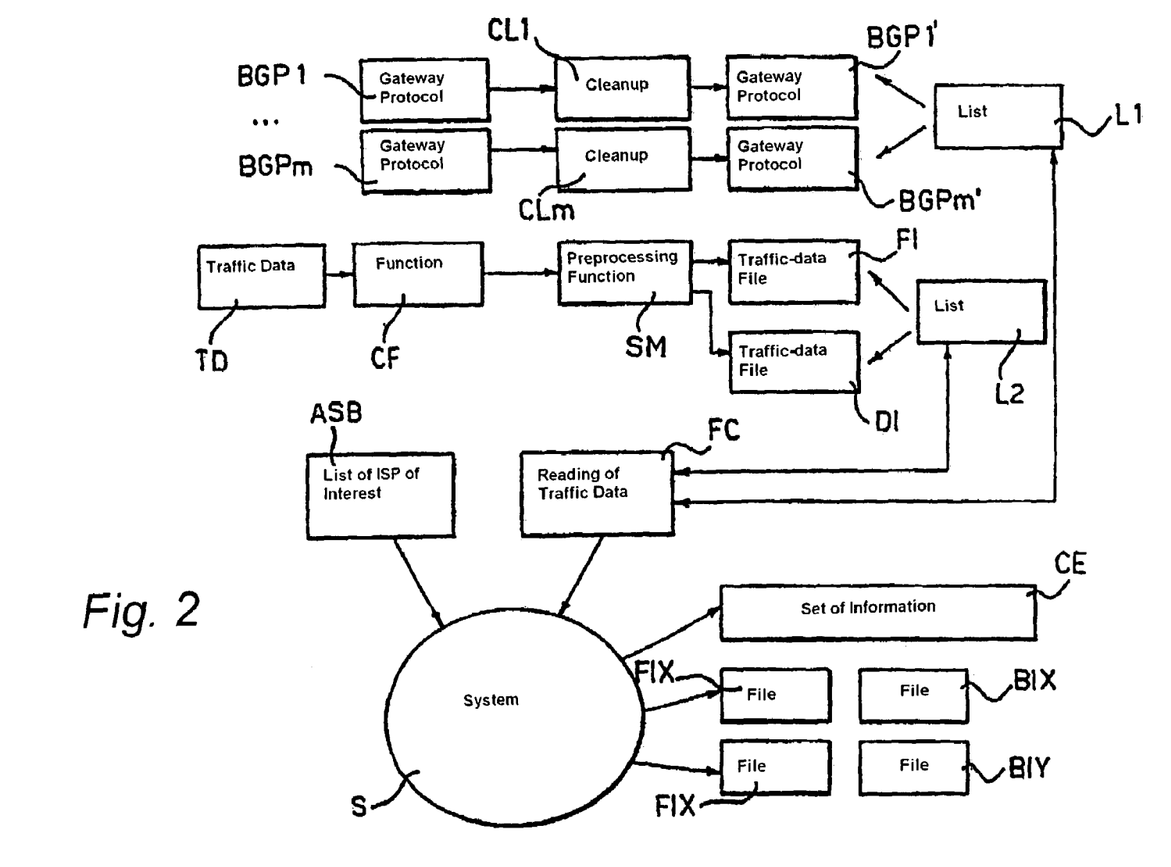
FIG. 2 is a functional block diagram illustrating the general architecture of a system according to the invention.

The system according to the invention makes resort to the databases essentially formed by the so called BGP tables and/or by similar tables, generically denoted by BGP1, . . . , BGPm, in FIG. 2. These tables may be supplied by appropriate public route servers, be derived from subjects toward which the connectivity evaluation must be mainly performed (i.e. the candidate ISPs 14) in other terms they may be still derived from the ISP suppliers 12.

It is therefore evident to the those skilled in the art that the solution according to the invention can be applied by using either the strictly defined BGP tables or by tables structurally similar or functionally equivalent to the BGP tables under question: for this reason in the claims which follow, reference will be generally made to tables of a "BGP type," in order to include within the invention also such similar or equivalent tables, the same considerations being applicable also to the extraction function of the BGP paths, which are to be dealt in the sequel.

The BGP tables essentially form a database wherein three parts may be distinguished (at logical level):

a first part, currently called Adj-RIBs-In, contains information collected from the incoming updating messages; the content of this part are the routing paths available as input for the decision process of the BGP procedure;

a second part, called Loc-RIB, contains the local routing information, that has been selected by applying the local policies to the routing data contained in the database part called Ad-RIBs-In; and a third part, called Adj-RIBs-Out, where the information is stored in view of the advertisement function to the subjects considered as "peers," with which the communication is performed through the BGP protocol.

The routing information which is stored in such a data-base is organized in a set of information elements, as listed below, namely:

IP destination network, and the string (called AS-path) describing the autonomous systems to be traversed in order to reach such an IP destination network.

This information is designed to be conveyed into the update messages sent toward the outside in the advertisement function directed to the subjects characterized as "peers."

Within the context herein considered, "peer" means in general another autonomous subject (AS) acting on the Internet and with which there is a co-operation relationship aimed at the traffic exchange and performed through the interconnection of at least two routers, one for each ISP, and the configuration of BGP peering sessions.

The system S described herein is designed to work on traffic data collected in a known way, acting for instance through passive probes, e.g. by means of the software product known under the trade name of Cisco IOS NetFlow™, made available by Cisco Systems Inc. (U.S.A.). The product makes it possible, through its different applications, to collect various data concerning the operation of a data-communication network such as the Internet, allowing for instance a detection of the traffic flows and an aggregation of the information being collected on the basis of various classification criteria: it is thereby possible to compute the traffic volumes directed to or coming from a particular destination/source.

The use of this product and in particular of the "NetFlow Switching" function working on the network nodes is usually the most economical solution, although it may be necessary to double-check that the on-board routers of the reference ISP 10 of FIG. 1 are capable of accepting the use of additional resources, required for collecting and exporting the traffic data.

Both the BGP tables and any traffic data collected are preferably pre-processed (for instance acting in a known way through so called auxiliary scripts) so that for instance the BGP tables have been cleaned-up of the comments, and the files relating to the traffic data are made available in order to be processed for further aggregations, as a function for instance of the autonomous system (AS) acting as a source or as a destination.

In FIG. 2, the blocks CL1, . . . , CLm stand for corresponding cleanup functions (removal of comments, etc. designed to work on the tables BGP1, . . . , BGPm, while the references BGP1', . . . , BGPm' represent the tables BGP resulting from the cleanup performed by functions CL1, . . . , C1m. After the cleanup, the BGP tables may be seen as merging into a corresponding list denoted by L1.

The reference TD instead indicates in general the traffic data collected through a function collectively denoted by CF (it may be for instance the NetFlow™ function, already mentioned before), while SM indicates a pre-processing function, the purpose of which is to allow additional processing on traffic data.

The SM function can be a simple program, written for instance in Visual C++6.0, in the form of a console application capable of aggregating the files relating the traffic data, by aggregating them for instance by source or by destination ASs.

The application of the SN function leads back to the formation of two traffic data files FI and DI, which refer to the forward traffic and the backward traffic, respectively. The meaning of such terms will be better understood in the sequel. Files FI and DI may be considered as forming a traffic data list, denoted by L2.

The lists L1 and L2 are typically configured as files and are in turn capable of merging into a configuration file FC wherein the names corresponding to the lists or tables L1 and L2 are written in the FC file in the appropriate lines, specifying the data path so as to prevent its execution from overlapping with the previous ones.

The ASB reference indicates a file corresponding to the list of the ISPs of interest, i.e. of the subjects for which a connectivity evaluation is requested. This term applies primarily to the ISPs whose connectivity characteristics are to is be estimated, so as to evaluate-on the basis of objective data, supplied by a technical instrument, such as the system according to the invention-the opportunity of establishing/confirming/modifying peering relationships.

The solution according to the invention is suitable for application in at least two essential contexts, namely:

the evaluation of the opportunity of establishing peering relationships with one or more candidate ISPs candidates 14 and/or confirming the relationships with one or more ISP suppliers 12, with the possibility of defining a priority/suitability classification in in order to establish the relationships: it is therefore an application, which in its final results is configured as an off-line and non-real time application; and the possibility, having identified a set of "peers" and defined the relationships with them, of executing interventions for re-balancing information flows, aimed at an efficient use of the peering links and at an optimized transmission of the traffic for the users; in such a case the technique according to the invention may be obviously used on-line.

The re-balancing interventions which have just been mentioned, are usually performed at time instants rather distant from one another, being foreseen for instance the execution of connectivity evaluations at interval of different hours from one another.

The solution according to the invention is suitable for both the execution at a first order or level, in which each ISP listed in the ASB file is evaluated by itself, and for the performance, at a second level, of aimed execution of an evolving kind. In the latter case, all the ISPs of interest recorded on the ASB file are in general considered, causing, as a function of the script executed at the first step, the execution of two further scripts.

The first of them creates a file of the ISP combinations with the specified sub-sequence, whilst the latter computes the connectivity of the different tuples of ISPs.

The results of the re-processing operations previously described are collected in corresponding files FIX, BIX, FIY and BIY, which contain the connectivity evaluations, forward FIX and backward BIX, for the X-the ISP taken into account toward/from each of the subjects, i.e. content suppliers (ASs), toward which and from which non-zero traffic volumes have been recorded. In each file there is a line for each pair considered-ISP/target-AS containing the AS identifiers of the X-the ISP under question and of the target AS, and the connectivity value estimated by the methods described in the sequel. FIY and BIY are the corresponding files relating to the Y-the ISP of the plurality (ASB).

These files are shown because they may be used as criteria for the distribution of the traffic in the second application identified above.

The reference CE denotes in FIG. 2 the set of information (forming actually the output data of the system according to the invention), containing the evaluations of total connectivity for each tuple of candidate ISPs.

As will be better seen in the sequel, such data may concern for example:

the algebraic sum, for each autonomous system AS acting as a target, of the connectivity of each of the IPSs included in the tuple being considered from/toward the same target AS; or the application of a criterion such as the assignment, as connectivity of the entire tuple toward/from a given target AS, of the max. connectivity toward/from the same target of each of the ISPs forming the tuple, or a cut-off function with appropriate contained modifications to the code of the script.

The cut-off function acts in such a way that, if the algebraic sum of the connectivity values of each of the ISPs forming the tuple toward/from a given target AS, divided by the traffic volume toward/from the same target AS exceeds a given value, the connectivity value of the tuple is set equal to such a threshold, multiplied by the traffic value toward/from the target AS. The determination of applicable threshold values may result from appropriate executions of the method itself.

Leaving apart the general flow of information collection and processing represented in FIG. 2, it must be noted that the individual functions and operations represented by each of the blocks which appear there are performed according to known criteria as such, thus making a further description in this context unnecessary.

With regard to the pre-processing of data traffic TD by the SM function, it is possible to aggregate the data for a given period, for instance three days, by first creating the aggregates of each day, and then making a further execution that processes the aggregated data of each day.

All the above must be carried out taking also into account the fact that in case of interfaces toward the so called BIG Internet (i.e. the interfaces toward the present ISP suppliers, denoted by 12, i.e. toward the outside), the systems of interest are the ASs of origin, whilst in case of interfaces toward the inside (i.e. toward the C users of the reference ISP 10) the systems of interest are the ASs destinations of the traffic.

This is due to the fact that a collection tool, such as the NetFlow™ function represented by the block CF, in its most spread version at present, only classifies the traffic received at the interfaces.

In the case of use of NetFlow for collecting the traffic simultaneously, two or more different threads can be used in parallel, each of them characterized by adequate filters such as to identify on each border router in the one case the interfaces toward the BIG Internet (external interfaces) and in the other the interfaces toward the inside. As a matter of fact it is preferred that the statistics of the traffic received are sorted according to the traffic direction (from the Internet, toward the Internet) already at the level of the basic collection through Netflow Collector (since the adopted aggregation does not show disaggregated data for each interface).

Furthermore, the border routers of the reference ISP 10 must be preferably so configured as to effect, for each IP flow, the association with the AS systems of origin and destination, and not with those seen as "peer-as" (i.e. those immediately preceding and immediately following in the information transmission chain).

Obviously, it also possible to envisage an option whereby the router associates to the flow the number of the AS system from which the packets arrive as origin and the number of the AS system to which the traffic is delivered as destination.

Instead, as to the functions CL1, . . . , CLm that carry out the clean-up of the BGP tables, it is preferred that the same tables eliminate all the initial and final comments and any other comments present between the valid lines so as to also recover valid lines, broken on two or more lines, i.e. not correctly terminated. The relating operation must be effected for each of the tables to be processed.

In this regard it must be noted that not all the public router servers supply a file already ready in a compressed format. To download the BGP table of a router server (subject to authorization of its managing part) an appropriate script, of a known type, is usually required, which by connecting via telnet to the router server makes it possible to request the table by block of n lines so as not to overload the CPU of the router server, thus avoiding, through an appropriate control character for every n lines, possible time out problems during the telnet session with the same router server, due to the transfer time of the table.

The ratio between the number of BGP paths and the number of the IP networks provides an estimation of the plurality of available sources. The downloading of the complete tables requires however a high-level script, capable of interacting in place of the human operator with the route-server, since the tables under question may consist of some millions of lines.

Preferably, in order to ease up the use of the system according to the invention, auxiliary scripts are foreseen for the preparation of the BGP tables, displaying their begin or final part, since these files are extremely large.

As has already been mentioned here several times, the system according to the invention is suitable for evaluating the connectivity for the benefit of a reference ISP with regard to one or more ISPs, such as for instance the candidate ISPs 14, in order to establish possible connectivity agreements. The system according to the invention herein illustrated makes it possible for this purpose to take account of the actual traffic present at the reference ISP 10, so that the starting point is therefore formed by a collection of traffic statistics effected on the network of such a reference ISP, at least at the internal and external interfaces of the border routers of the same client. The solution described here allows it to set-up a sorted list of ISPs of most convenient use for transmitting traffic toward the target ASs in the Internet and for receiving traffic from the same, such an evaluation duly taking into account the actually experienced traffic.

Figure 3:
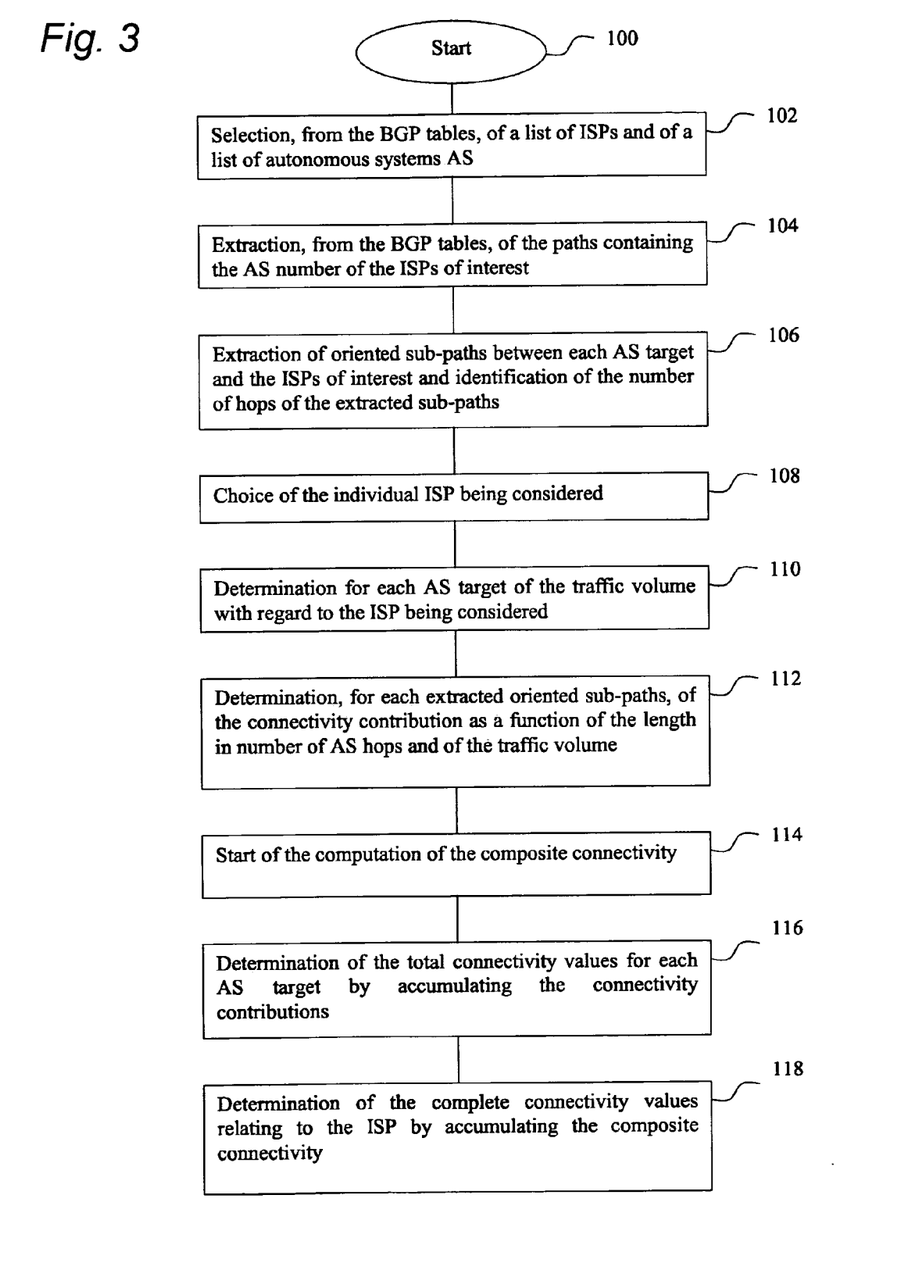
FIG. 3 is a flow chart illustrating the mode of operation of a system according to the invention.

Passing now to the flow chart of FIG. 3, we will see that the reference 100 indicates a standard start step after which, at a step denoted as a whole by 102, the system S carries out the extraction of the information contained in the BGP tables denoted by the references BGP1' to BGPm'.

The execution of such step involves the reading of corresponding configuration files and a list of ISPs of interest (see step 102, FIG. 3).

Such a list, stored on ASB, may include both candidate ISPs 14, and possibly ISPs that are already included within the ISP suppliers 12.

Therefore the reading is effected of number of ISPs to be considered, and of coefficients of the weight functions to be subsequently used, and additionally the definition is made of the number or tuple of the peering relationships the reference ISP 10 wishes to establish.

It is also necessary to carry out the reading of the traffic files collected thanks to the CF function. Such files are read starting from an aggregation by autonomous system AS and with the subsequent processing SM that aggregates them according to source AS or to destination AS, and carrying then out the loading in associative arrays, represented by DI and FI in FIG. 2, using as a key the AS number and as a value the number of the traffic bytes.

It will be appreciated that such a formalism, which is also used in the sequel of the present description, makes reference to the possible adoption, for implementing this invention, of the programming language called PERL. This choice, though being preferred at present, is obviously neither mandatory nor binding for the implementation of the invention.

The next step is then the computation of the combinations of tuples and the writing of a corresponding file. To this end, the starting point is the list of the AS numbers contained in ASB and among them a first set or group of ISPs of interest is then considered.

On this ISP group of interest all possible tuples are computed, and then a combination per line is written in the resulting file.

At a subsequent step, globally indicated by 104, the actual extraction is carried out of the information from the BGP tables as well as the extraction of the BGP paths concerning the ISPs of interest.

To perform the first function, on each table cleaned-up of the comments, a search is made of lines capable of satisfying specified characteristics described by predefined patterns, for instance the presence of a sequence of characters of IP address type, in the A. B. C. D. form (where A, B, C, and D are decimal digits) at the beginning of the line after three characters. From each line satisfying the required characteristic the AS path is extracted (see step 104, FIG. 3) and then set in a line of the output file. The path is preferably identified starting from the bottom of the line by the character terminating the AS path ("i," "e" or "?") up to the first zero.

The preferred procedure envisages the reading of a line at a time and each line being read, is subdivided into strings, using as separation characters such as "space" and "tab." The extracted path is written in a line of a temporary file. Such a file is then opened and for each ISP of interest the paths are searched containing the AS number of the ISP under question.

At this point, the AS path is subdivided into two parts. The first part, from the ISP to the last element of the AS sequence (ASM), converges into the forward or upstream file, denoted in the sequel by FPX; the second part, from the first element of the AS sequence (AS1) to ISP, converges into the backward or downstream file, denoted by DPX. Thus, there is a pair of files FPX and DPX for each ISP of interest.

By "forward" we obviously mean the information relating to the way the rest of the Internet is reached, from a given ISP, whereas by "backward" we indicate all information arriving at a given ISP from the Internet.

The FPX and DPX files are therefore submitted to a compacting operation by using associative arrays that have as a key the AS path for avoiding repetitions of the same. This is done for the reason that each sequence appears only once and at the end the associative arrays are written again in the files by only writing the keys.

At the subsequent steps indicated here on one side by 106, 108, 110 and 112 and on the other by 114, 116 and 118, the computation is performed of the connectivity with traffic weights defined for the various sub-paths and the computation of the composite connectivity for each tuple that has been detected.

This is performed with separate reference to the forward direction or upstream, and the backward direction or downstream.

For each ISP of interest being considered a cycle is performed so that for each target system AS in the file FPX associated to the same ISP, the lines are searched that contain such a target system AS in a final or intermediate position. Per each line that satisfies such a condition, an oriented sub-path is extracted and then used as a key for a temporary associative array having a value of the weight function calculated on the basis of the length in number of AS hops of the extracted sub-string.

After processing the entire file, the paths and the different sub-paths contribute to the connectivity from the ISP being considered up to the AS system being used as a target. The contribution is defined in a preferred way (it will be appreciated that this choice as such is not binding, since it possible to make resort to different weighing laws) as the product of the weight function evaluated on the basis of the length in AS hops of each sub-path multiplied by the traffic volume in bytes addressed to the target AS.

The value of the overall connectivity from the ISP being considered up to the AS regarded as a target (together with the relating values identifying the provider ISP and the system AS being considered) are written in a line of a corresponding output file.

This operation is performed as many times as the number of the AS systems included in the set T of FIG. 1.

A similar cycle is carried out for each system AS considered as a target to find out the backward connectivities up to the provider ISP under question.

Also in this case the search is made of the lines containing in an initial or intermediate position the target system AS in the DPX file associated to the ISP being considered. Thus the associative array of the sub-paths from the target system AS up to the provider ISP under question is derived and the connectivity contribution of each sub-strings is computed as the product of the traffic volume produced by the target AS system by the weight function evaluated through the length in AS hops of the sub-path under question. The relating AS number identifiers and the resulting connectivity value are written in a line of a corresponding file. Also in this case, the processing operation is performed as many times as the number of AS systems comprised in the group T of FIG. 1.

The file of the total connectivities is produced by reading the individual files and adding for each target AS system the forward and backward connectivities.

Specifically, step 106 in the flow chart of FIG. 3 makes reference to the computation operation of the connectivity with traffic weights and sub-paths, whilst step 108 indicates the choice of the individual provider ISP being considered, selected from the file ASB. The step indicated by 110 concerns the determination for each target AS system of the destination traffic, whilst step 112 collectively indicates the other operations previously described.

The computation of the composite connectivity is started at step 114. This is followed by step 116 wherein a tuple is read from the respective file determined at step 102, then calculating the value of the connectivity from the first provider ISP of the tuple toward each target system AS detected from the traffic file. Using the target system AS as a key of an associative temporary array the data accumulate of the different paths from the first provider ISP previously considered toward the target system AS being considered.

The same procedure is repeated for the other ISPs forming the current tuple.

This holds true for the forward connectivity; a similar procedure shall apply for the backward direction and the file of the totals.

Specifically, the associative array is built for each provider ISP forming the current tuple. This takes place at step 118, where also the complete connectivity is obtained by setting then in a output file the connectivity value attained, followed by the indication of the tuple for which it has been computed on the same line.

For each target AS the computation is made (through the weighing law chosen, such as the algebraic sum to which reference was made before by way of an example) of the connectivity contribution of the tuple from and toward the target AS under question.

At a subsequent step, denoted by 120, the files of the results obtained are sorted according to decreasing connectivity values, obtained from each tuple of the ISP being considered or candidate ISP. This is accomplished by using an associative array that has as a key the connectivity value, sorting the keys or writing then the entire line of the input file in an ordered output file.

Figure 4:
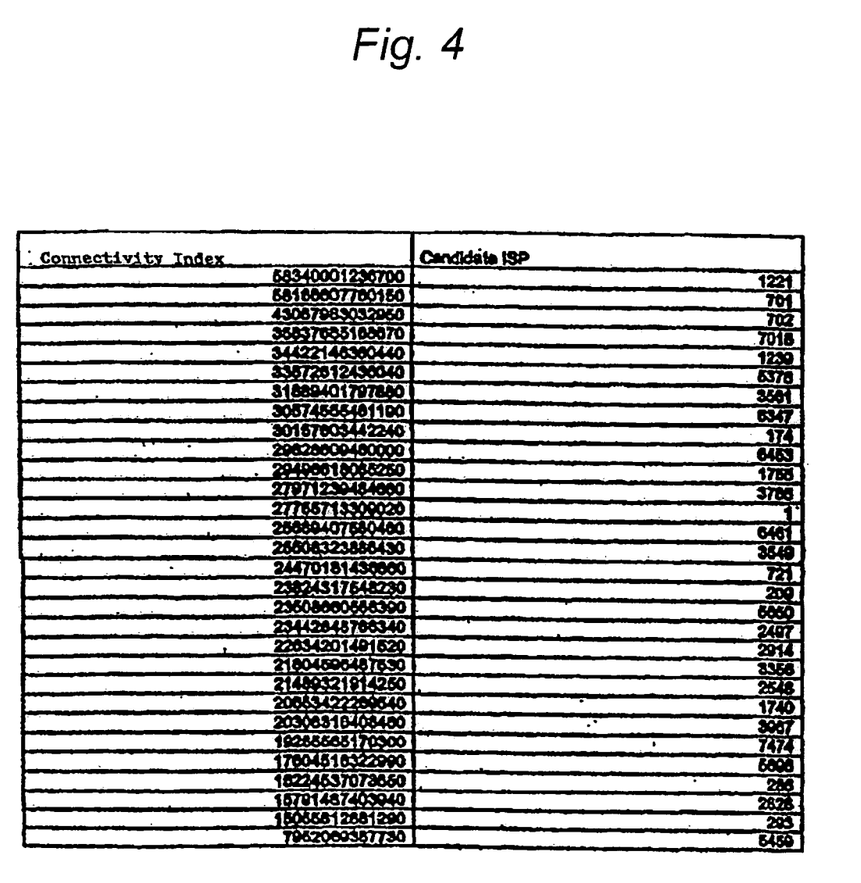
FIGS. 4 and 5 show two sorted lists of connectivity values, which can be generated according to the invention.
Figure 5:
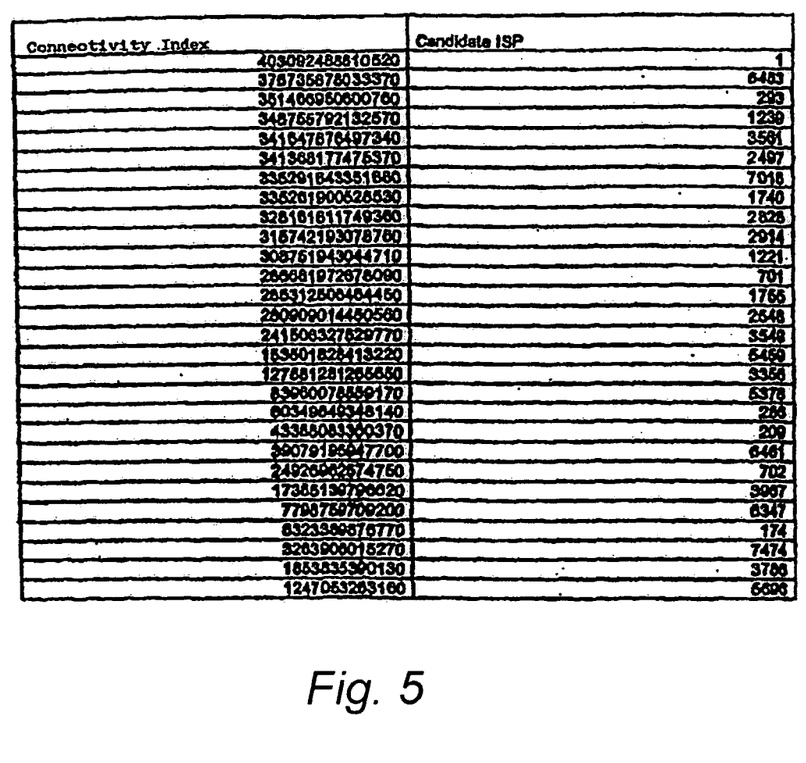

FIGS. 4 and 5 depict two examples of connectivity "standings" of the type indicated above, produced in the form of disaggregated results for both the backward and the forward direction.

It will be appreciated that tables of this type may be produced also as a global result of a backward/forward aggregated type.

Furthermore it will also be appreciated that the connectivity computation function of the tuple of provider ISPs can be implemented in different ways. As an example of an accumulation, reference has been made previously to a function of algebraic sum: experiments conducted by the Applicant have proved that such choice is definitely advantageous, being at the same time extremely simple in its implementation.

The extraction of the BGP paths takes for granted the availability of a string defining the border of the AS path. Such a string may be represented by a "weight" parameter (e.g. equal to 0) of the BGP information contained in the relating table, usually stored on the router. The solution according to the invention is however not restricted to such a choice.

It will be also appreciated that it is possible to write the code or script in a more compact way, by using structures as references to the associative arrays (they are essentially sort of a pointer) and subroutines of various nature. The pointers allow one to use subroutines to which parameters are passed, and which act upon each call on a different associative array. The use of a 64-bit floating point arithmetic proves widely satisfactory for the modalities of operation described before.

Obviously, keeping unchanged the principle of the invention, its details of implementation and the embodiments may be widely varied with respect to what has been previously described and illustrated, thus without leaving the scope of the present invention. This applies in particular but not exclusively to the possibilities of performing connectivity evaluations concerning the forward direction only or the backward direction only.

The invention claimed is:

1. A method for performing, for the benefit of a reference provider having a set of users, connectivity evaluations over a data communication network with respect to at least one provider of interest the method comprising the steps of:
   selecting a plurality of autonomous systems adapted to form a traffic source or a traffic destination for users of said reference provider through the reference provider,
   supplying tables of Border Gateway Protocol type containing information on paths available on said data communication network for routing said traffic with regard to the autonomous systems of said plurality of systems,
   extracting from said tables the paths of Border Gateway Protocol type associated with said at least one provider of interest, by searching the paths that contain the respective number of autonomous system for said at least one provider of interest,
   extracting for each autonomous system of said plurality of systems, oriented subpaths between each of said autonomous systems and said at least one provider of interest, by identifying for each subpath a respective length in number of hops,
   identifying for each autonomous system of said plurality of systems a forward traffic volume or a backward traffic volume with regard to the users of said reference provider,
   determining, for each of said subpaths connectivity contribution as a function of the respective length in number of hops and of the forward traffic volume or the backward traffic volume,
   determining for each autonomous system of said plurality of systems total connectivity values accumulating the connectivity contributions determined for the oriented subpaths extracted for each of said autonomous systems, and
   accumulating the total connectivity values determined for the autonomous systems of said plurality of systems, so as to obtain total connectivity values relating to said at least one provider of interest.

2. The method according to claim 1 wherein the steps are carried out for a plurality of providers of interest present on said data communication network.

3. The method as recited in claim 2, further comprising the step of:
   sorting the total connectivity values obtained for the providers of interest of said plurality of systems in at least one sorted list.

4. The method as recited in claim 1, further comprising the steps of:
   identifying for each autonomous system of said plurality of systems both the forward traffic volume and the backward traffic volume with regard to the users of said reference provider, and
   determining for each of said subpaths respective contributions of connectivity as a function of the respective length in number of hops and of both said volumes of forward traffic and backward traffic.

5. The method as recited in claim 4 further comprising the step of:
   generating values of total connectivity for said at least one provider of interest disaggregated into values of total connectivity for forward traffic and backward traffic.

6. The method as recited in claim 1 further comprising the step of
submitting said tables of Border Gateway Protocol type to a clean-up operation to eliminate comments contained in said tables.

7. The method as recited in claim 2, further comprising the step of:
selectively reallocating transit traffic through said reference provider on at least one part of said providers of interest of said plurality of systems.

8. A system for performing for the benefit of a reference provider having a set of users connectivity evaluations on a data communication network with respect to at least one provider of interest, the system comprising:
tables of Border Gateway Protocol type containing information on paths available on said data communication network for routing traffic with regard to a plurality of autonomous systems adapted to establish at least a source or a destination for traffic of users of said reference provider through the reference provider,
detection means for detecting, for each autonomous system of said plurality of systems, at least one between a forward traffic volume and a backward traffic volume with regard to the users of said reference provider, and
processing means for:
extracting from said tables the paths of Border Gateway Protocol type associated with said at least one provider of interest, by searching for the paths that contain the respective number of autonomous system for said at least one provider of interest
extracting for each autonomous system of said plurality of systems oriented subpaths between said each autonomous system and said at least one provider of interest, identifying for each subpath a respective length in number of hops,
determining for each of said subpaths a connectivity contribution as a function of the respective length in number of hops and of said forward or backward traffic volume with regard to the users of said reference provider,
determining for each autonomous system of said plurality of systems total connectivity values accumulating the connectivity contributions determined for the oriented subpaths extracted for each said autonomous system, and
accumulating the total connectivity values determined for the autonomous systems of said plurality of systems, so as to obtain values of total connectivity relating to said at least one provider of interest.

9. The system as recited in claim 8, configured for performing connectivity evaluations for a plurality of providers of interest present on said data communication network.

10. The system as recited in claim 9, further comprising:
means for sorting the total connectivity values obtained for the providers of interest of said plurality of systems in at least one sorted list.

11. The system as recited in claim 8 wherein:
said detection means is configured for detecting for each autonomous system of said plurality of systems, both the forward traffic volume and the backward traffic volume with regard to the users of said reference provider, and
said processing means is configured for determining, for each of said subpaths, respective connectivity contributions as a function of the respective length in number of hops and of both said forward traffic volume and backward traffic volume.

12. The system as recited in claim 11 wherein said processing means is configured for generating total connectivity values for said at least one ISP of interest, disaggregated into total forward connectivity values and total backward connectivity values.

13. The system as recited in claim 8 further comprising:
pre-processing means for submitting the tables of Border Gateway Protocol type to a cleanup operation to eliminate comments contained in said tables.

14. The system as recited in claim 9 wherein the providers of interest of said plurality of systems are equipped with a selective re-balancing module for re-balancing the transit traffic through said reference provider.

* * * * *